United States Patent [19]

Paluska, Jr.

[11] Patent Number: 4,846,009
[45] Date of Patent: Jul. 11, 1989

[54] COUNTERSHAFT TRANSMISSION

[75] Inventor: Roy T. Paluska, Jr., Washington, Ill.

[73] Assignee: Caterpillar Inc., Peoria, Ill.

[21] Appl. No.: 110,914

[22] Filed: Oct. 21, 1987

[51] Int. Cl.$^4$ .............................................. F16H 3/08
[52] U.S. Cl. ...................................... 74/331; 74/360
[58] Field of Search .................. 74/331, 333, 360, 361, 74/359, 357, 329

[56] References Cited

U.S. PATENT DOCUMENTS

| | | | |
|---|---|---|---|
| 3,318,167 | 5/1967 | Frost | 74/331 |
| 3,425,293 | 2/1969 | Krawczyk et al. | 74/360 |
| 3,858,455 | 1/1975 | Sisson et al. | 74/360 |
| 4,145,935 | 3/1979 | Herlitzek | 74/331 |
| 4,333,358 | 6/1982 | Grattapaglia | 74/359 |
| 4,341,127 | 7/1982 | Stodt | 74/333 |
| 4,523,655 | 6/1985 | Keenan et al. | 180/9.1 |
| 4,589,294 | 5/1986 | Keenan et al. | 74/331 |
| 4,589,295 | 5/1986 | Jerry et al. | 74/360 |
| 4,627,302 | 12/1986 | Laylock et al. | 74/360 |
| 4,726,246 | 2/1988 | Whalen | 74/360 |

OTHER PUBLICATIONS

Portion of Shop Manual SEBMO4190100 on Komatsu Model WA300-1 Transmission, published circa Jun., 1984.
Portion of Shop Manual SEBMO382COO on Komatsu Model W90-3 Transmission published circa Feb., 1983.

Primary Examiner—Dwight G. Diehl
Attorney, Agent, or Firm—Charles E. Lanchantin, Jr.

[57] ABSTRACT

A countershaft transmission includes an input shaft, a countershaft, an output shaft, first and second disc type directional clutches associated with the input shaft, and disc type speed clutches associated with the countershaft and output shaft to selectively connect a plurality of constantly meshing gears in preselected patterns to provide three forward speeds and three reverse speeds for a work vehicle such as a track-type tractor. The gears and clutches are functionally arranged in a forward and reverse mechanism serially connected to a three-speed mechanism and a speed reduction ratio change can be made to the speed mechanism without effecting the speed reduction ratio of the forward and reverse mechanism. Reverse speeds greater than 20% faster than the corresponding forward speeds are possible using a three-gear train in the forward and reverse mechanism. The gears, and the directional and speed clutches are arranged to provide a radially and longitudinally compact transmission.

2 Claims, 2 Drawing Sheets

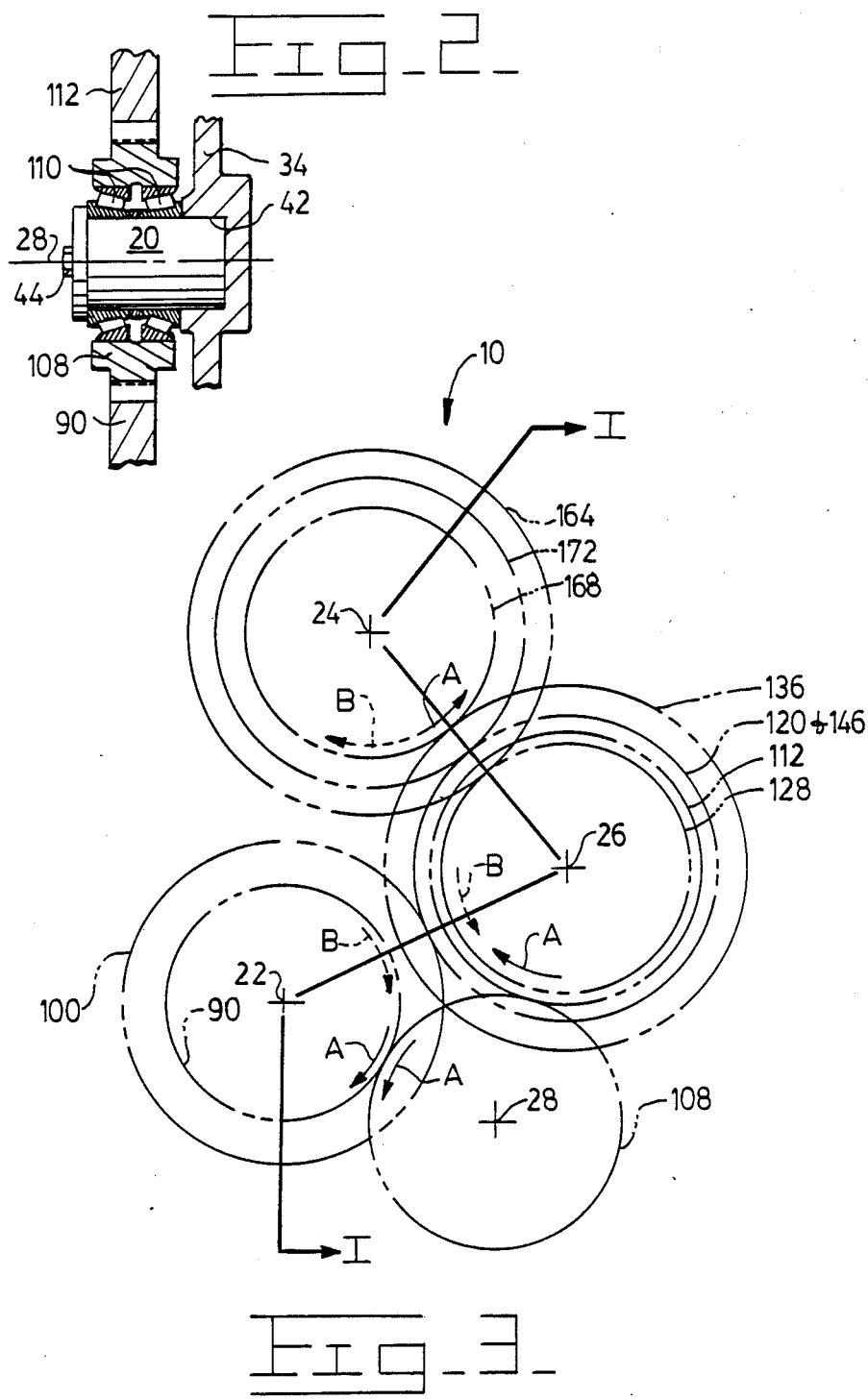

COUNTERSHAFT TRANSMISSION

DESCRIPTION

1. Technical Field

This invention relates to a countershaft transmission for a heavy duty work vehicle, and more particularly to a countershaft transmission for a track-type tractor or the like having a plurality of forward and reverse speeds utilizing constant mesh gearing and a plurality of fluid actuated, rotating disc type clutches so constructed and arranged as to provide maximum compactness and speed reduction ratio flexibility.

2. Background Art

Countershaft transmissions having a plurality of speed ratios in each direction of operation have been found to be particularly useful in the drive line of heavy duty work vehicles such as wheel loaders, rubber tired log skidders, and lift trucks. These transmissions are advantageous in that a plurality of rotating disc type clutches and associated continually meshing gears can be so positioned on the usual parallel shafts as to allow considerable design flexibility and an adaptability to the elevational drop requirement between the input and output axes.

Exemplifying the art in this area are the following U.S. Pat. Nos.: 3,425,293 issued Feb. 4, 1969 to H. S. Krawczyk, et al; 3,858,455 issued Jan. 7, 1975 to R. L. Sisson, et al; 4,333,358 issued June 8, 1982 to G. P. Grattapaglia; 4,341,127 issued July 27, 1982 to E. Stodt; and 4,523,655 issued June 18, 1985 to T. F. Keenan, et al. Also, Kabushiki Kaisha Komatsu Seisakusho of Tokyo, Japan produces a number of satisfactory countershaft transmissions of this general class including Machine Model WA300-1 that provides four forward and four reverse speeds.

One of the problems with these prior countershaft transmissions is that they have been axially too long. For example, two or even more rotating clutches and a plurality of gears have been so arranged along a single shaft axis with respect to the supporting walls of the housing as to be of excessive length. Simultaneously, the shafts, clutches and gears have not been sufficiently closely radially spaced and internested so as to provide both a radially compact and axially compact module.

Another problem with some of these countershaft transmissions is that the gears are interconnected in such a way that it is difficult to change the speed reduction ratio between the forward and reverse speeds independently of the speed ratio steps between the individual gear ratios. Moreover, still other countershaft transmissions cannot be simply modified to provide a relatively significant speed reduction ratio differential between the forward and reverse speeds in the same gear range or a relatively substantial overall step ratio.

The individual speed reduction ratios of the desired transmission should not only provide the range of output speeds that will best serve the vehicle requirements, but should be capable of convenient modification so that the same basic unit can be used in various vehicular applications. For certain track-type tractor applications where high drawbar pull is desired in the forward working gears, it is preferred that each of the travel speeds in reverse be approximately 30% faster than the corresponding forward speed. It should be an easy matter to change this relative speed, between first forward and first reverse, for example, without requiring modification of the individual speed steps, without changing the central axes of the shafts, and without requiring much more than the substitution of certain gear pairs within the countershaft transmission.

Still other desirable features are to maximize parts commonality by using similarly sized rotating clutch elements, to provide a long service life by so constructing and arranging the gears that undesirably high operating speeds or clutch plate engagement speeds are avoided, and to place the individual members thereof in locations that will allow the convenient assembly or disassembly thereof with respect to the housing or case elements.

Accordingly, what is needed is a structurally simple, and both radially and axially compact constant mesh countershaft transmission providing at least three forward speeds and one, two or three reverse speeds using a minimal number of shafts, rotating clutches and associated elements. Preferably, the transmission should have a long service life and be so constructed and arranged as to allow the effective conversion of the speed ratio collectively between the forward and reverse speeds independently of the individual speed reduction ratio steps or vice versa. This can provide a family of transmissions that can maximize parts commonality while making the family adaptable to a wide variety of vehicular applications.

DISCLOSURE OF THE INVENTION

The present invention is directed to overcoming one or more of the above problems.

In one aspect of the invention there is provided a countershaft transmission including an input shaft having first and second gears freely rotatably mounted thereon, first and second directional clutch means for selectively connecting the respective first and second gears to the input shaft, an idler third gear connected to the first gear, a countershaft having fourth and fifth gears mounted for conjoint rotation therewith with the fourth gear being connected to the idler third gear and the fifth gear being connected to the second gear. Moreover, a sixth gear and a seventh gear are mounted for free rotation on the countershaft and an eighth gear is connected for joint rotation therewith. An output shaft has a ninth gear and a tenth gear mounted for joint rotation therewith, an eleventh gear mounted freely rotatably thereon, and speed clutch means are provided for selectively connecting one of the sixth, seventh and eleventh gears to the respective shaft. The sixth, seventh and eighth gears are arranged in independent meshing pairs with the ninth, tenth and eleventh gears to maximize speed ratio flexibility and the speed clutch means includes a speed clutch located on the output shaft between the ninth and tenth gears for overall compactness.

Advantageously, the instant countershaft transmission provides three forward speeds, and up to three reverse speeds, all of the gear trains thereof are independent of each other, and any gear ratio can be changed without affecting the other ratios. Also, the ratio between forward and reverse can be changed without affecting the speed steps. The transmission is very compact with two closely radially spaced pairs of disc type clutches being arranged in back-to-back relation along the input shaft and countershaft in laterally offset, but longitudinally aligned relation and with a fifth disc type clutch being similarly arranged along the output shaft. Thus, in a side view of the developed transmission the clutches are nearly in line and located between the majority of the gears for maximum compactness.

BRIEF DESCRIPTION OF THE DRAWINGS

FIG. 2 is a fragmentary sectionalized view of an idler gear forming a portion o the countershaft transmission illustrated in FIG. 1, but not shown therein; and FIG. 3 is a diagrammatic elevational view of the countershaft transmission of FIG. 1 taken along line III—III thereof showing the position of the various shaft axes, the nested disposition of certain gears, and the cutting plane of developed FIG. 1.

BEST MODE FOR CARRYING OUT THE INVENTION

Figure 1:
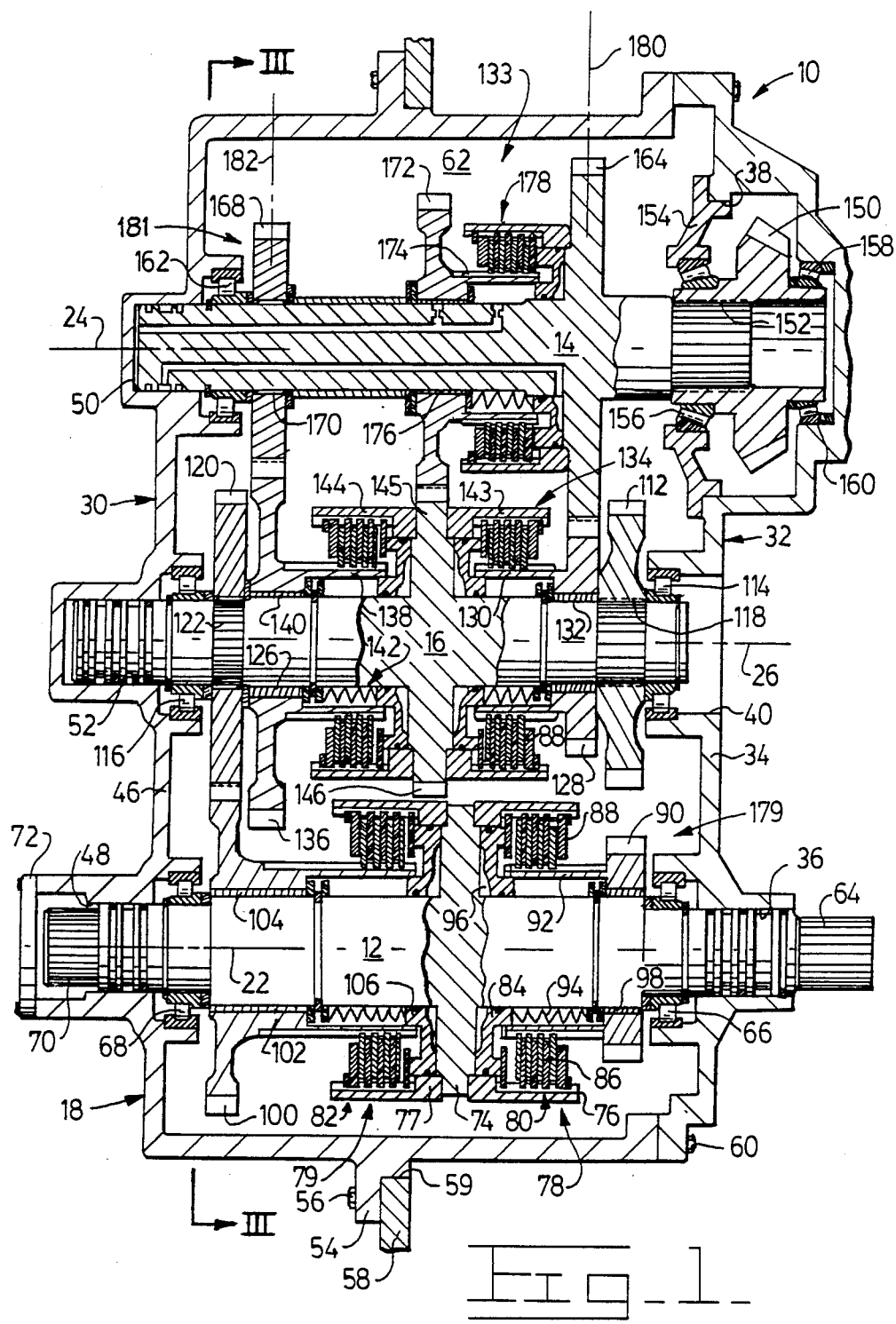
FIG. 1 is a diagrammatic, developed, but substantially side elevational sectionalized view of a three-speed forward and three-speed reverse countershaft transmission constructed in accordance with the present invention.

Referring to FIG. 1, there is shown a countershaft transmission 10 having a lower input shaft 12, an upper output shaft 14, and an intermediately positioned countershaft 16 rotatably supported in a housing or case 18. An idler gear support shaft 20 illustrated in FIG. 2 is also releasably secured to the housing 18, and the shafts 12, 14, 16 and 20 respectively have parallel axes 22, 24, 26 and 28 that have an elevational end view relationship as is shown in FIG. 3. It can be noted from FIG. 3 that the idler gear support shaft is located elevationally below the input shaft, and the axes are arranged in a relatively tight or compact quadrangle.

The housing 18 is generally constructed of two major pieces; namely, a rear main case portion 30 disposed at the left when viewing FIG. 1, and a front cover portion 32 located at the right. A front wall 34 of the cover portion integrally defines a stepped bore 36 on the input axis 22, a bore 38 on the output axis 24, a stepped bore 40 on the intermediate axis 26, and a blind bore 42 on the idler gear axis 28 as is shown in FIG. 2. The front end of the idler gear support shaft 20 is seated in the bore 42 and is releasably secured to the front wall by one or more threaded fasteners or bolts 44, one of which is illustrated. Similarly, a rear wall 46 of the main case portion 30 integrally defines a stepped bore 48 on the input axis 22, and blind cylindrically-shaped stepped pockets 50 and 52 on the output axis 24 and on the intermediate axis 26, respectively. The housing is generally cylindrical in shape, and a peripherally extending mounting flange 54 is integrally formed on the main case portion. A plurality of threaded fasteners or bolts 56 extend therethrough in use to releasably secure the transmission to an annular vehicle frame member 58. The frame member defines a cylindrical bore 59 therethrough and the countershaft transmission 10 is pilotably received in that bore. Another plurality of threaded fasteners or bolts 60 secure the main case portion 30 and the cover portion 32 positively together and serve to define an internal chamber 62.

Input shaft 12 has a front spline portion 64 which is preferably driven by an engine and a hydrodynamic torque converter arranged in series in the usual way, although not illustrated. The front end of the input shaft is rotatably supported in the front wall 34 by a roller bearing assembly 66 seated in the stepped bore 36, and the rear end is rotatably supported in the rear wall 46 by another roller bearing assembly 68 seated in the stepped bore 48. The input shaft has a rear spline portion 70 that can be coupled to a power take-off (PTO) shaft, not shown, for driving auxiliary equipment on the vehicle such as a winch or the like. A cover plate 72 can be releasably secured to the main case portion 30 when the PTO shaft is not utilized.

An annular web 74 is integrally formed on the input shaft 12 centrally thereof, and an internally splined front drum 76 and an internally splined rear drum 77 are integrally secured to the web as by welding or the like. The drums 76 and 77 respectively form the driving members of first directional clutch means 78 and second directional clutch means 79. More specifically, the first and second directional clutch means respectively include a forward clutch 80 and a reverse clutch 82 of the usual interleaved multiple plate and disc type. For example, the forward clutch 80 includes an annular actuating piston 84 selectively movable to the right when viewing FIG. 1 when pressurized fluid is delivered thereto through the shaft to clamp a plurality of interleaved annular plates and friction discs, collectively identified by the reference number 86, against a reaction plate 88. This connects a first gear 90 and an integrally associated externally splined hub 92 for conjoint rotation with the input shaft 12. The forward clutch is positively disengaged by movement of the actuating piston back to the left by a plurality of compression springs 94, one of which is shown, when fluid pressure is reduced to an actuation chamber 96 behind the actuating piston. This allows the hub 92 and the first gear 90 to freely rotate together on the input shaft through an intermediate sleeve bearing or equivalent needle bearing assembly 98.

A second gear 100 and an integrally associated externally splined hub 102 are also freely rotatably mounted on the input shaft 12 by a sleeve bearing or needle bearing assembly 104. Movement of an actuating piston 106 of the reverse clutch 82 to the left when viewing FIG. 1 couples the second gear 100 and hub 102 to the input shaft. Thus, actuation of the forward and reverse clutches 80 and 82 are effective to provide drive to either of the gears 90 and 100, with it being understood that the designation of clutches 80 and 82 as being forward and reverse is arbitrary and could be just as easily considered as being reverse and forward respectively.

As shown in FIG. 2, an idler third gear 108 is freely rotatably mounted on the stationary stub-type support shaft 20 through a pair of opposed tapered roller bearing assemblies 110 in a conventional manner. The idler third gear is intermeshingly engaged directly with the first gear 90 on the input shaft 12 and a fourth gear 112 located on the countershaft 16.

Turning now to FIG. 1, the countershaft 16 is supported at its front end in a roller bearing assembly 114 seated in the stepped bore 40 of the front wall 34, and at its rear end in a roller bearing assembly 116 seated in the stepped pocket 52 in the rear wall 46. The fourth gear 112 is connected to continually rotate with the countershaft through a front spline joint 118, and a fifth gear 120 which is intermeshed with the second gear 100 is similarly connected for conjoint rotation therewith through a rearwardly disposed spline joint 122. A sixth gear 128 and associated hub 130 are mounted for free rotation on the front end of the countershaft through a sleeve bearing or needle bearing assembly 132, and are selectively coupled for joint rotation therewith by speed clutch means 133 including, specifically, a first speed clutch 134. A seventh gear 136 and an associated hub 138 are freely rotatably mounted on the rear end of the countershaft through another sleeve bearing or needle bearing assembly 140. The speed clutch means 133 includes a third speed clutch 142 for selectively coupling the seventh gear 136 directly to the countershaft. A front drum 143 and a rear drum 144 are integrally connected to a centrally located countershaft web 145, and these drums form a portion of the back-to-back first and third speed clutches 134,142 in a manner similar to the construction of the back-to-back forward and reverse clutches 80 and 82. However, in this instance a ring-like eighth gear 146 is integrally formed on the periphery of the web 145 for conjoint rotation with the countershaft.

The upper output shaft 14 is indirectly rotatably supported at its front end by an output bevel pinion gear 150 through an intermediate spline joint 152. An annular adapter plate 154 is releasably secured to the front wall 34 at the bore 38, and a tapered roller bearing assembly 156 is seated within the adapter plate to provide support for one end of the pinion gear. Another tapered roller bearing assembly 158 is seated within a blind bore 160 defined in the rear surface of the front wall 34 to provide support for the other end of the output pinion gear. It is to be appreciated that one end of the output shaft could be rotatably supported in the front wall 34 in any number of ways without departing from the spirit of the present invention. The other end of the output shaft is supported by a roller bearing assembly 162 seated in the stepped pocket 50 in the rear wall 46.

A ninth gear 164 forms an integral part of the front portion of the output shaft 14, and a tenth gear 168 is releasably connected to the output shaft through a rear spline joint 170. An eleventh gear 172 and externally splined hub 174 are freely rotatably mounted on the output shaft via a sleeve bearing or needle bearing assembly 176. The eleventh gear and hub are selectively connected to the output shaft by a second speed clutch 178 of the speed clutch means 133. The sixth and ninth gears 128 and 164 are continually intermeshed, the seventh and tenth gears 136 and 168 are continually intermeshed, and the eighth and eleventh gears 146 and 172 are continually intermeshed respectively.

Essentially, the directional clutches 80 and 82, the gear pair 100-120, and the gear train 90-108-112 define a forward and reverse mechanism 179 that is serially arranged ahead of the speed clutches 134,142 and 178, and the gear pairs 128-164, 136-168 and 146-172 that define a three-speed mechanism 181.

The first, second and third speed clutches 134, 178 and 142 are similar in construction to the directional clutches 80 and 82 and therefore need not be described in detail. However, many of the individual members thereof are advantageously the same size for improved parts commonality. For example, all of the speed clutches use the same size clutch plates, discs and pistons. The directional clutches use a common larger diameter size of these plates, discs and pistons.

INDUSTRIAL APPLICABILITY

In operation, the input shaft 12 is driven by the engine and torque converter of the vehicle in a clockwise direction when viewing along input axis 22 in FIG. 3. Assuming that a first forward speed condition is desired, the operator so controls the vehicle that the forward clutch 80 and the first speed clutch 134 are hydraulically actuated so as to clamp the interleaved plates and discs thereof together. This connects the first gear 90 to the input shaft 12 and the sixth gear 128 to the countershaft 16. Accordingly, the output shaft 14 is driven at a relatively low speed by way of the three gear chain 90-108-112 and the gear pair 128-164. It is to be noted here that the intermeshing gears 90-108-112 form the only three gear train in the instant transmission. As shown by the arrows indicated by the letter A in FIG. 3, the output shaft 14 is driven in a counterclockwise direction.

It is only necessary to disengage the first speed clutch 134 and to engage the second speed clutch 178 in order to shift the countershaft transmission 10 from first to second forward speed. In this mode, the speed reduction ratio is reduced and the output shaft 14 is driven in the same counterclockwise direction at a higher speed by way of the three gear chain 90-108-112 and the gear pair 146-172.

The second speed clutch 178 is disengaged and the third speed clutch 142 is engaged to make an upshift from the second forward to the third forward speed condition. This further reduces the speed reduction ratio and speeds up the output shaft 14 via the three gear chain 90-108-112 and the gear pair 136-138.

In the first reverse speed condition, only the reverse clutch 82 and the first speed clutch 134 are engaged. Torque is thereby transmitted to the output shaft 14 through the gear pairs 100-120 and 128-164. As shown by the broken line arrows identified by the letter B in FIG. 3, the output shaft is thus driven in a clockwise direction because the idler third gear 108 is not included in the power path. Second speed reverse is achieved by engaging clutches 82 and 178 so that the torque transmitting path is by way of gear pairs 100-120 and 146-172. Third speed reverse is obtained by engaging clutches 82 and 142, and driving the output shaft 14 via gear pairs 100-120 and 136-168.

The number of gear teeth and corresponding speed reduction ratios obtained with one embodiment of the countershaft transmission 10 are shown by the charts immediately below:

| Number of Gear Teeth | | | |
|---|---|---|---|
| First | Gear | 90:36 | teeth |
| Second | Gear | 100:54 | teeth |
| Third | Gear | 108:37 | teeth |
| Fourth | Gear | 112:45 | teeth |
| Fifth | Gear | 120:52 | teeth |
| Sixth | Gear | 128:38 | teeth |
| Seventh | Gear | 136:60 | teeth |
| Eighth | Gear | 146:50 | teeth |
| Ninth | Gear | 164:62 | teeth |
| Tenth | Gear | 168:40 | teeth |
| Eleventh | Gear | 172:50 | teeth |

| | Gear Reduction Ratio | |
|---|---|---|
| | Forward | Reverse |
| First Gear | −2.04 | 1.57 |
| Second Gear | −1.25 | 0.96 step 1.63 |
| Third Gear | −0.83 | 0.64 step 1.50 |
| (overall step) | (2.45) | (2.45) |

A feature of the countershaft transmission 10 is that the speed gear pair 128-164 defines a first plane 180 centrally thereof normal to the shaft axes 22, 24 and 26, and the speed gear pair 136-168 defines a second plane 182 centrally thereof and parallel to the first plane 180, and all five clutches 80, 82, 134, 178 and 142 are axially located substantially between these two planes. In a balanced manner the directional three gear train 90-10-8-112 is located axially exteriorly of the planes 180,182 at the front end thereof, and the directional gear pair 100-120 is located axially exteriorly of the planes at the rear end thereof. Moreover, the gear pair 146-172 is located axially between these planes. This results in an extremely axially compact transmission. At the same time, the back-to-back clutches 80-82 and 134-142 are closely radially spaced and longitudinally aligned, and the second speed clutch 178 is closely radially spaced and longitudinally aligned therewith. The back-to-back clutch pairs 80-82 and 134-142 and the clutch 178 form a compact triangle when viewed along the axes as may be appreciated by reference to the gear locations illustrated in FIG. 3.

The construction of the two-piece housing 18 and its bores 36, 38, 40, 42 and 48 and pockets 50 and 52 allows the convenient assembly of the shafts 12, 14, 16 and 20 and associated members assembled thereon substantially simultaneously, and the construction of the housing provides a plurality of fluid passages for directing pressurized fluid to the clutch actuating pistons and for directing lubricating and cooling fluid to the clutches and bearings through the shafts 12, 14 and 16, although this is not illustrated in full detail.

One of the major features of the countershaft transmission 10 is that a speed reduction ratio change can be made to any of the speed gear pairs 128-164, 136-168 and 146-172, which comprises a three-speed mechanism when considered with the associated clutches, without effecting the speed reduction ratio of the directional pair of gears 100-120 or the three-gear train 90-108-112 which comprises a directional mechanism when considered with the associated clutches. Thus, the countershaft transmission 10 provides flexibility of design between the speeds and between forward and reverse so that it can be conveniently modified for a variety of vehicular applications without changing the location of the axes 22, 24, 26 and 28 or modifying the housing 18. The construction of the aforementioned Komatsu Model WA300-1, for example, is not sufficiently compact and is much more restricted in achieving the combination of the overall ratio and the desired step between forward and reverse.

In view of the foregoing, it is apparent that the constant mesh countershaft transmission 10 is simple and rugged in its construction, and is very compact. It features the forward and reverse mechanism 179 ahead of, and independent of, the three-speed mechanism 181, with an elevationally lower input shaft 12 and an elevationally higher output shaft 14. The three-gear train 90-108-112 provides the speed reduction capability necessary to obtain a relatively large speed ratio between the forward and reverse speeds, for example above 20%, than is possible with many other designs. This provides high drawbar capability in the forward gears and high travel speeds in the reverse gears which is particularly desirable for track-type tractor use.

Other aspects, objects and advantages of this invention can be obtained from a study of the drawings, the disclosure and the appended claims.

I claim:

1. A countershaft transmission comprising:
an input shaft having first and second gears mounted for free rotation thereon;
a first directional clutch adaptable to connect the first gear to the input shaft;
a second directional clutch adaptable to connect the second gear to the input shaft;
a countershaft having a fourth gear, a fifth gear and an eighth gear connected for joint rotation therewith, and a sixth gear and a seventh gear mounted for free rotation thereon;
an idler third gear connected between the first gear and the fourth gear;
a first speed clutch adaptable to connect the sixth gear to the countershaft;
a third speed clutch adaptable to connect the seventh gear to the countershaft;
an output shaft having a ninth gear and a tenth gear connected for joint rotation therewith, and an eleventh gear mounted for free rotation thereon;
the second and fifth gears being connected, the sixth and ninth gears being connected and defining a first plane normal to the shafts, the seventh and tenth gears being connected and defining a second plane parallel to the first plane, and the eighth and eleventh gears being connected to provide three forward and three reverse speeds and to maximize speed ratio flexibility;
a second speed clutch located between the first and second planes and adaptable to connect the eleventh gear to the output shaft; and
wherein the fifth gear, the seventh gear, the eighth gear, the sixth gear and the fourth gear are arranged in serial relation on the countershaft.

2. In a countershaft transmission of the type having an input shaft with first and second gears mounted for free rotation thereon, a first directional clutch adaptable to connect the first gear to the input shaft for joint rotation, a second directional clutch adaptable to connect the second gear to the input shaft for joint rotation, an idler third gear intermeshed with the first gear, a countershaft having fourth and fifth gears mounted for joint rotation therewith, the fourth gear being intermeshed with the idler third gear and the fifth gear being intermeshed with the second gear, the improvement comprising:
a sixth gear and a seventh gear mounted for free rotation on the countershaft;
an eighth gear connected for joint rotation with the countershaft;
an output shaft;
a ninth gear and a tenth gear mounted for joint rotation with the output shaft;
an eleventh gear mounted for free rotation on the output shaft;
a first speed clutch adapatable to connect the sixth gear to the countershaft for joint rotation;
a second speed clutch located on the output shaft and adaptable to connect the eleventh gear to the output shaft for joint rotation;
a third speed clutch adaptable to connect the seventh gear to the countershaft for joint rotation; and
the sixth, seventh and eighth gears being intermeshed in pairs with the ninth, tenth and eleventh gears, with the pairs and the first, second, and third speed clutches being located longitudinally between the second and fifth gears, and the first third and fourth gears.

* * * * *